United States Patent
Huelsen

(10) Patent No.: US 11,794,666 B2
(45) Date of Patent: Oct. 24, 2023

(54) ROOF FOR A MOTOR VEHICLE COMPRISING A SENSOR MODULE

(71) Applicant: Webasto SE, Stockdorf (DE)

(72) Inventor: Michael Huelsen, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/633,275

(22) PCT Filed: Aug. 11, 2020

(86) PCT No.: PCT/EP2020/072486
§ 371 (c)(1),
(2) Date: Feb. 7, 2022

(87) PCT Pub. No.: WO2021/032535
PCT Pub. Date: Feb. 25, 2021

(65) Prior Publication Data
US 2022/0348149 A1 Nov. 3, 2022

(30) Foreign Application Priority Data
Aug. 19, 2019 (DE) ...................... 10 2019 122 168.4

(51) Int. Cl.
*B60R 11/04* (2006.01)
*B62D 25/06* (2006.01)
(Continued)

(52) U.S. Cl.
CPC .............. *B60R 11/04* (2013.01); *B62D 25/06* (2013.01); *G01S 13/931* (2013.01); *B60R 2011/004* (2013.01); *G01S 2013/9327* (2020.01)

(58) Field of Classification Search
CPC ......... B60R 11/04; B62D 25/06; G01S 7/027; G01S 7/4813; G01S 13/931; G01S 17/931; G01S 2013/9327
(Continued)

(56) References Cited

U.S. PATENT DOCUMENTS

2016/0297482 A1  10/2016  Sakabe et al.
2017/0369003 A1  12/2017  Williams et al.
(Continued)

FOREIGN PATENT DOCUMENTS

EP    2 860 820 A1    4/2015
EP    3 078 987 A1   10/2016

OTHER PUBLICATIONS

Translation of International Search Report and Written Opinion for PCT/EP2020/072486 dated Feb. 17, 2022, in English (10 pages).
(Continued)

*Primary Examiner* — Dennis H Pedder
(74) *Attorney, Agent, or Firm* — Fitch, Even, Tabin & Flannery, LLP

(57) ABSTRACT

A roof for a motor vehicle, in particular for a passenger car, the roof having a support structure, a roof skin at least partially covering the support structure, roof side beams which are part of a vehicle body, and at least one sensor module having an environment sensor for detecting a vehicle environment. The sensor module may be disposed on the support structure and is for a large part located below a reference roof indentation plane which is in tangential contact with one of the roof side beams and inclined relative to a horizontal plane by a first angle ($\alpha$) in the transverse direction of the roof and by a second angle ($\beta$) in the longitudinal direction of the roof.

9 Claims, 4 Drawing Sheets

(51) Int. Cl.
*G01S 13/931* (2020.01)
*B60R 11/00* (2006.01)

(58) Field of Classification Search
USPC .................. 296/210, 215, 193.04, 193.12
See application file for complete search history.

(56) References Cited

U.S. PATENT DOCUMENTS

2018/0037267 A1  2/2018  Williams et al.
2018/0037268 A1  2/2018  Moore et al.

OTHER PUBLICATIONS

International Search Report for PCT/EP2020/072486 dated Jan. 25, 2021, in English and German (8 pages).

ROOF FOR A MOTOR VEHICLE COMPRISING A SENSOR MODULE

CROSS-REFERENCE TO RELATED APPLICATION

This application is a U.S. national phase application filed under 35 U.S.C. § 371 of International Application No. PCT/EP2020/072486, filed Aug. 11, 2020, designating the United States, which claims priority from German Patent Application Number 10 2019 122 168.4 filed on Aug. 19, 2019, which is hereby incorporated herein by reference in its entirety for all purposes.

FIELD

The invention relates to a roof for a motor vehicle, in particular for a passenger car, the roof comprising the features of the preamble of claim 1.

BACKGROUND

A roof of this kind is known from practice and can in particular be part of an autonomously or semi-autonomously driving motor vehicle. Motor vehicles of this kind are increasingly common. In order for the autonomous or semi-autonomous driving to meet high safety requirements, a vehicle controller has to be connected to a plurality of environment sensors by means of which vehicle surroundings can be detected so that the traffic situation can be determined and analyzed based on the measurement result at hand. In known motor vehicles, sensor modules comprising environment sensors for monitoring and detecting the vehicle surroundings are also attached to the vehicle roof since the vehicle roof is typically the highest point of a vehicle, from where the vehicle environment is easily visible.

Sensor modules known to date, which can comprise Lidar sensors, radar sensors, optical sensors, such as cameras or the like, as environment sensors, have housings which are made of metal in a dimensionally stable manner and have a high weight. This necessitates additional measures on the roof in question in order for the existing safety requirements to be met. For instance, additional bracings and additional plates have to be integrated in order to ensure sufficient crash safety and to pass the roof indentation tests prescribed in this regard. In roof indentation testing, the raised contact points formed by the sensor modules have to absorb forces and divert them via the vehicle structure since there would otherwise be the risk that the sensor modules are pushed into the vehicle interior and endanger vehicle passengers. However, the previously used measures on the vehicle structure which are supposed to prevent the latter make the roof as a whole heavy and expensive.

The object of the invention is to provide a roof of the kind mentioned above which is provided with a sensor module comprising at least one environment sensor and does not require elaborate reinforcement measures for ensuring passenger safety.

According to the invention, this object is attained by the roof having the features of claim 1.

SUMMARY

The at least one sensor module of the roof according to the invention is disposed on the support structure in such a manner that its upper or topmost boundary surface or even a roof skin portion located above the sensor module protrudes only slightly if at all beyond a roof line which would be present in a comparable roof without a sensor module. This achieves that forces which may occur in a crash situation in which the vehicle in question overturns do not have to be absorbed and diverted by the sensor module. Instead, these forces can be absorbed in the usual way by the roof side beams or the roof base structure and can be diverted into the vehicle body. Thus, special reinforcement measures in the area of the support structure and in the area of the sensor modules are at least largely unnecessary. Consequently, the integration of the sensor module in the roof does not result in any weight-intensive and cost-intensive additional measures.

The reference roof indentation plane defined herein is a virtual plane which is in tangential contact with a roof side beam and which is inclined relative to a horizontal plane by a first angle in the transverse direction of the roof and by a second angle in the longitudinal direction of the roof as per the legal requirements.

The first angle is preferably between 20° and 30°, in particular about 25°. The second angle is preferably between 2° and 10°, in particular about 5°.

A motor vehicle has four of the reference roof indentation planes mentioned above, namely in each corner area, i.e., one in each of the two front corner areas of the roof and one in each of the two rear corner areas of the roof.

In a crash safety test, a large plunger is moved toward the roof plane-parallel to the reference roof indentation plane. In the case of the roof according to the invention, the plunger front face and the sensor module or a roof skin portion above the sensor module which is attributed to the sensor module make first contact only shortly before, ideally after, the plunger reaches the reference roof indentation plane. The first contact defines a plane of first contact which is also oriented parallel to the reference roof indentation plane.

The environment sensor of the roof according to the invention can be configured in various ways and can comprise in particular a Lidar sensor, a radar sensor, an optical sensor, such as a camera, and/or the like.

So for the roof according to the invention, which can be configured as an integrated compact roof module which can be placed on top of a vehicle body as a unit, sensor modules and components which have a low structural height are used in particular, and/or the sensor modules and components are connected and integrated in such a manner that they do not or only partially protrude beyond the roof indentation plane.

The sensor module is connected to or integrated in the support structure, which can be formed by a frame or a bow of the roof itself, which is configured as a roof module, or by the vehicle body shell.

In a specific embodiment of the roof according to the invention, the sensor module is disposed on the support structure in a lowered position, in which case the support structure can have a lowered mounting base for the sensor module.

Brackets and other components of the sensor module or of other vehicle elements which are required for realizing autonomous driving can also be integrated in the roof. For protection, the sensor module itself can be provided with a lid or a hood which can be part of the roof skin and define the plane of first contact.

In a specific embodiment of the roof according to the invention, the sensor module is covered by the roof skin, which thus forms a protection for the sensor module. The roof skin can be a single element or be composed of multiple parts.

The upper boundary surface of the sensor module is preferably raised by no more than about 12.5 cm, i.e., about 5 inch, perpendicular to the reference roof indentation plane. So the plane of first contact and the reference roof indentation plane preferably have a maximum distance of 12.5 cm. The sensor module, which forms a roof-mounted structure in the broadest sense, protrudes only slightly above a roof baseline, which is a virtual line which would form the roof line of a roof without a sensor module.

The sensor module is in particular an integrated part of the roof according to the invention and is covered by the roof skin, which is a single element or composed of multiple parts, for example. In order for the environment sensor to be able to detect the vehicle surroundings, i.e., the vehicle environment, the roof skin is advantageously provided with a window for the environment sensor, the window being transparent at least for the wavelengths used by the environment sensor, such as for a wavelength range between 200 nm and 2000 nm and also for radar radiation.

The material of the roof skin can also be selected in such a manner that it is permeable to the required wavelength ranges with the result that no separate window or separate window area is needed.

The roof according to the invention can be a purely solid roof or can be provided with a roof opening system comprising a cover element by means of which a roof opening can be opened or closed at will.

In particular, the roof according to the invention is a roof of a passenger car.

The invention also relates to a motor vehicle comprising a roof of the kind described above.

Other advantages and advantageous configurations of the subject matter of the invention are apparent from the description, the drawing, and the claims.

Exemplary configurations of a passenger car comprising a roof according to the invention are schematically illustrated in the drawing and will be explained in more detail in the following description.

BRIEF DESCRIPTIONS OF THE DRAWINGS

FIGS. 1 to 4 show a motor vehicle 10 which is configured as a passenger car and has a vehicle body 12, which is a body shell structure, a vehicle roof 14 being disposed on vehicle body 12. Vehicle roof 14 comprises a roof module 16 which is configured as what is referred to as a roof sensor module (RSM) and is therefore provided with a sensor system enabling motor vehicle 10 to drive autonomously.

Figure 1:
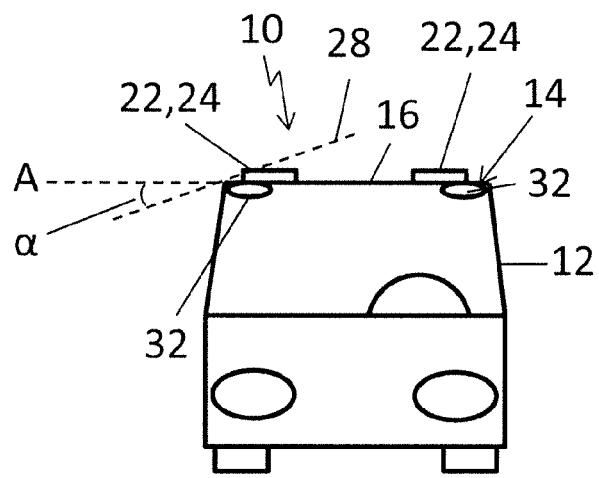
FIG. 1 is a front view of a vehicle comprising a roof according to the invention.
Figure 2:
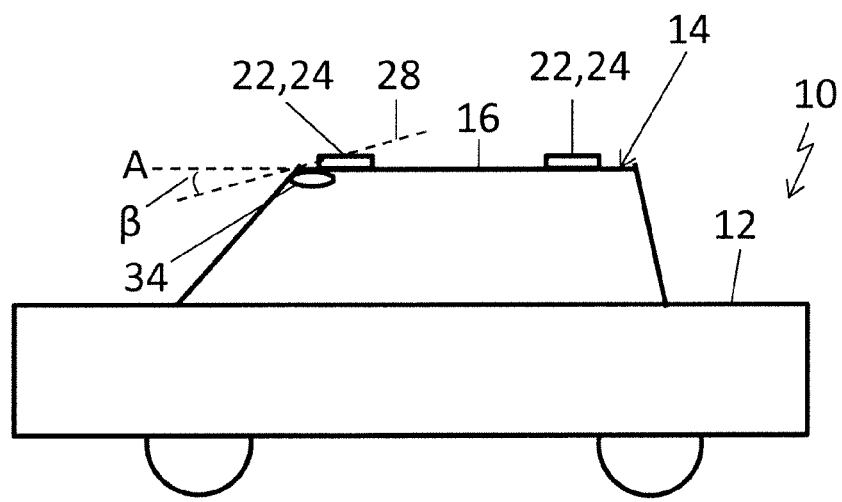
FIG. 2 is a side view of the vehicle.
Figure 3:
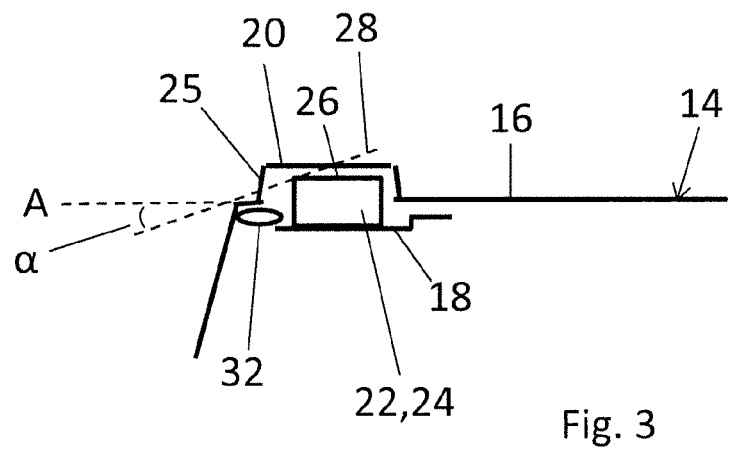
FIG. 3 is a section through the roof of the vehicle in the area of a roof side beam.
Figure 4:
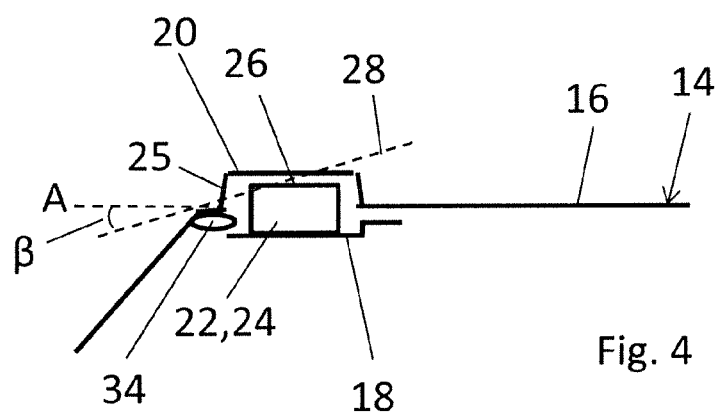
FIG. 4 is a section through the roof in the area of a front header.

Roof module 16, which can be seen in FIGS. 3 and 4 in particular, comprises a support structure 18, which forms a support frame, and a roof skin 20, which forms a solid roof element and which may be partially transparent, roof skin 20 forming an outer roof skin.

DETAILED DESCRIPTION

Furthermore, roof module 16 is provided with four sensor modules 22 each comprising an environment sensor 24 by means of which the vehicle surroundings can be detected in order to implement autonomous driving of motor vehicle 10. A current traffic situation can be determined by evaluating the measuring signals of environment sensors 24 by means of a controller of motor vehicle 10 with the result that motor vehicle 10 can autonomously adapt to the traffic situation and behave accordingly. Sensor modules 22 are each disposed in a corner area of roof module 16 and are an integral part thereof. Moreover, sensor modules 22 are each covered by roof skin 20.

Environment sensors 24 of sensor modules 22 can each be configured in various ways and can comprise a Lidar sensor, a radar sensor, a camera (mono/multi/multi-focal and/or stereo camera) and/or any other suitable sensor, for example.

Sensor modules 22 are disposed on support structure 18, i.e., on the roof frame, and can each monitor a defined area of the vehicle surroundings through a window cut-out 25 of roof skin 20, said window cut-outs 25 being transparent for the wavelengths used by the environment sensors.

In the area of each of sensor modules 22, roof skin 20 forms a prominence due to the structural height of each sensor module 22.

The structural height of each of sensor modules 22 is selected in such a manner that an upper boundary surface 26 is at least largely located below a reference roof indentation plane 28. Reference roof indentation plane 28 is a virtual plane which is in tangential contact with a roof side beam 32 associated with respective sensor module 22 and which is inclined relative to a horizontal plane by an angle α of 25° in the transverse direction of the roof and by an angle β of about 5° in the longitudinal direction of the roof.

Moreover, the structural height of sensor modules 22 is selected in such a manner that their upper boundary surfaces 26 are raised by no more than about 12.5 cm relative to the reference roof indentation plane. Consequently, upper boundary surfaces 26 of sensor modules 22 are also located only lightly above a roof baseline A. Roof baseline A is a line which corresponds to a roof line of a vehicle roof without sensor modules, which would consequently not have any prominences of the roof skin due to sensor modules.

The low architecture of sensor modules 22, which are for a large part located below roof indentation planes 28 and 30, allows vehicle roof 14 to be designed essentially without any additional reinforcements since the risk that sensor modules 22 will be pushed in the direction of a vehicle interior in an accident situation in which motor vehicle 10 overturns is low.

Figure 5:
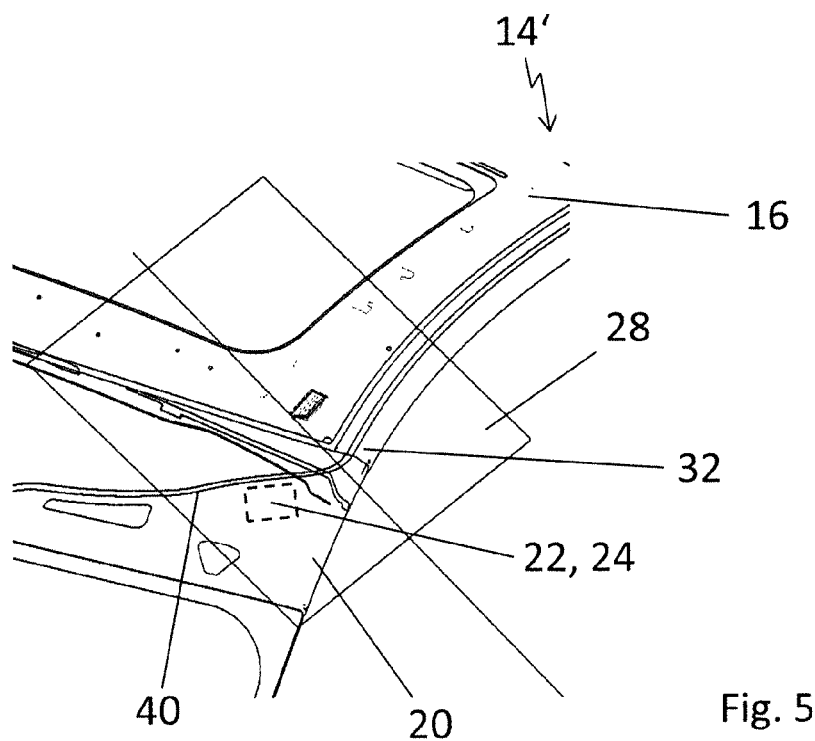
FIG. 5 is a perspective view of a front left roof portion of an alternative embodiment of a vehicle roof according to the invention.
Figure 6:
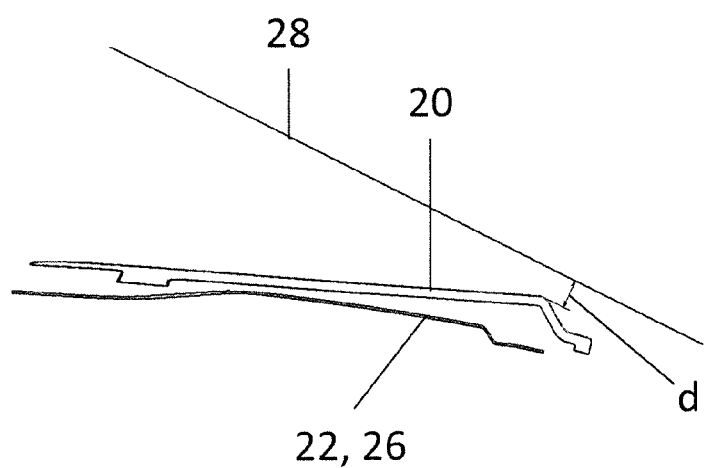
FIG. 6 is a section through the vehicle roof of FIG. 5 in the area of a sensor module.

FIGS. 5 and 6 show a vehicle roof 14' which is disposed on a vehicle body and comprises a roof module 16 which is configured as what is referred to as a roof sensor module (RSM) and therefore has a sensor system enabling vehicle 10 to drive autonomously.

Similarly to the embodiment according to FIGS. 1 to 4, vehicle roof 14' comprises four sensor modules 22 disposed in corner areas of roof module 16 and each comprising an environment sensor 24 by means of which the vehicle surroundings can be detected in order to implement autonomous driving of the motor vehicle. Sensor modules 22, which are an integral part of roof module 16, are each disposed behind a step 40 of roof skin 20 and covered by roof skin 20. Step 40, which constitutes a prominence, is due to the structural height of sensor modules 22.

In the embodiment according to FIGS. 5 and 6, environment sensors 24 of sensor modules 22 can also be configured in various ways and comprise a Lidar sensor, a radar sensor, a camera and/or any other suitable sensor, for example Sensor modules 22 are each disposed on a support structure (not shown) formed by a roof frame which is part of roof module 16.

The structural height of sensor modules 22 and resulting step 40 of roof skin 20 are selected in such a manner that an upper boundary surface 26 of respective sensor module 22 and also roof skin 20 are located below a reference roof indentation plane 28, which is a virtual plane which is in tangential contact with a roof side beam 32 associated with respective sensor module 22 and which is inclined relative to a horizontal plane by an angle of 25° in the transverse direction of the roof and by an angle of 5° in the longitudinal direction of the roof. As can be seen in FIG. 6, roof skin 20 has a point of first contact 44 which is formed on the step in the area of sensor module 22 and which has a distance d of 16 mm perpendicular to reference roof indentation plane 28. Point of first contact 44 defines a roof skin plane of first contact which is oriented parallel to reference roof indentation plane 28 and located below reference roof indentation plane 28. The actual plane of first contact, in which a test plunger approaching parallel to reference roof indentation plane 28 makes contact with the vehicle in question in a crash test, coincides with reference roof indentation plane 28.

Figure 7:
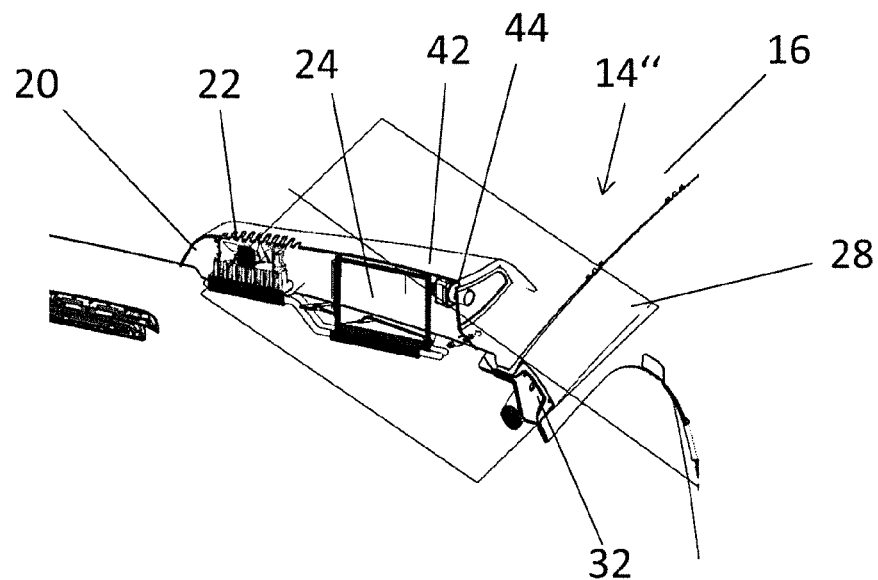
FIG. 7 is a perspective section view of another embodiment of a vehicle roof according to the invention in the area of a sensor module.
Figure 8:
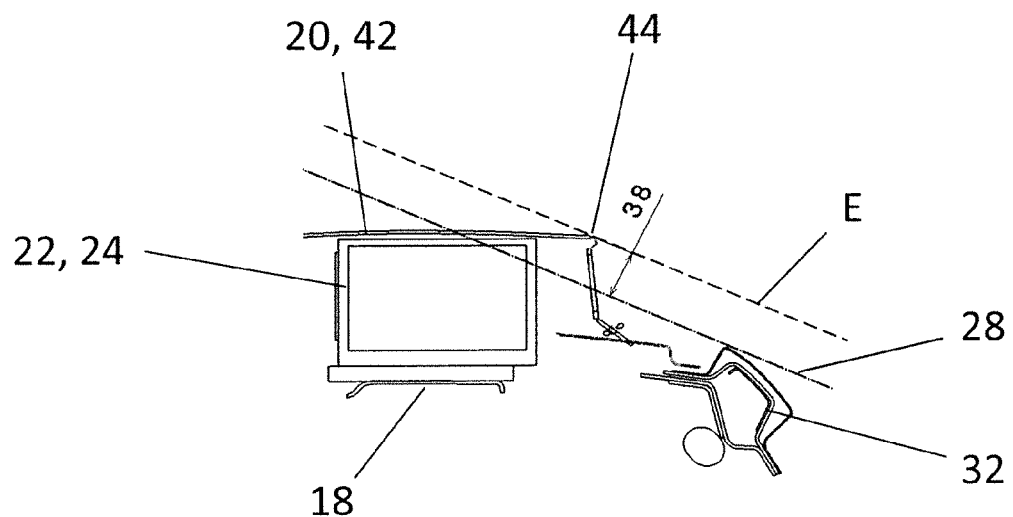
FIG. 8 is a section through the vehicle roof in the area of the sensor module.

FIGS. 7 and 8 show a vehicle roof 14", which also comprises a roof module 16 configured as a roof sensor module (RSM).

Vehicle roof 14" also comprises a sensor module 22 in each of its corner areas, each sensor module 22 comprising at least one environment sensor 24 for detecting the vehicle environment. In the area of sensor module 22, a roof skin 20 forms a bump 42 which covers sensor module 22. Bump 42 of roof skin 20 forms an upper housing portion of sensor module 22 and is therefore part of sensor module 22, which is disposed on a support structure 18 which is part of roof module 16.

In a crash test, bump 42 of roof skin 20 forms a point of first contact 44 which defines a plane of first contact E which is formed parallel to a reference roof indentation plane 28 which is in tangential contact with a roof side beam 32 and inclined relative to a horizontal plane by an angle of 25° in the transverse direction of the roof and by an angle of 5° in the longitudinal direction of the roof. Plane of first contact E has a distance of 38 mm to reference roof indentation plane 28.

The invention claimed is:

1. A roof for a motor vehicle, the roof comprising:
   a support structure,
   a roof skin at least partially covering the support structure,
   roof side beams which are part of a vehicle body, and
   at least one sensor module comprising an environment sensor for detecting a vehicle environment,
   wherein the sensor module is disposed on the support structure and is for a large part located below a reference roof indentation plane which is in tangential contact with one of the roof side beams and inclined relative to horizontal plane by a first angle ($\alpha$) in the transverse direction of the roof and by a second angle ($\beta$) in the longitudinal direction of the roof;
   wherein the roof is an integrated compact roof module which can be placed on top of the vehicle body as a unit; and
   wherein the support structure is a roof frame and the sensor modules are each disposed in a corner area of the roof module on the roof frame.

2. The roof according to claim 1, wherein the first angle ($\alpha$) is between 20° and 30° and is in particular about 25°.

3. The roof according to claim 1 or 2, wherein the second angle ($\beta$) is between 2° and 10° and is in particular about 5°.

4. The roof according to claim 1, wherein the sensor module is covered by the roof skin.

5. The roof according to claim 1, wherein an upper boundary surface of a portion of the sensor module extends above the reference roof indentation plane by no more than about 12.5 cm.

6. The roof according to claim 1, wherein the roof skin forms a window for the environment sensor.

7. The roof according to claim 2, wherein the first angle ($\alpha$) is about 25°.

8. The roof according to claim 3, wherein the second angle ($\beta$) is about 5°.

9. A roof for a motor vehicle, the roof comprising:
   a support structure,
   a roof skin at least partially covering the support structure,
   roof side beams which are part of a vehicle body, and
   at least one sensor module comprising an environment sensor for detecting a vehicle environment,
   wherein the sensor module is disposed on the support structure and is for a large part located below a reference roof indentation plane which is in tangential contact with one of the roof side beams and inclined relative to horizontal plane by a first angle ($\alpha$) in the transverse direction of the roof and by a second angle ($\beta$) in the longitudinal direction of the roof;
   wherein the roof is an integrated compact roof module which can be placed on top of the vehicle body as a unit;
   wherein the support structure is a roof frame and the sensor modules are each disposed in a corner area of the roof module on the roof frame; and
   the roof module comprises four sensor modules each comprising an environment sensor for detecting a vehicle environment.

* * * * *